US006546243B2

(12) United States Patent
Tiedemann, Jr. et al.

(10) Patent No.: US 6,546,243 B2
(45) Date of Patent: *Apr. 8, 2003

(54) METHOD AND SYSTEM FOR OVER-THE-AIR (OTA) SERVICE PROGRAMMING

(75) Inventors: Edward G. Tiedemann, Jr., Concord, MA (US); Irfan Khan, San Diego, CA (US); Alejandro R. Holcman, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/056,087

(22) Filed: Jan. 23, 2002

(65) Prior Publication Data

US 2002/0094808 A1 Jul. 18, 2002

Related U.S. Application Data

(63) Continuation of application No. 08/728,467, filed on Oct. 10, 1996, now Pat. No. 6,381,454.
(60) Provisional application No. 60/005,011, filed on Oct. 10, 1995.

(51) Int. Cl.[7] ............................................. H04M 3/00
(52) U.S. Cl. ......................... 455/419; 455/433; 455/551
(58) Field of Search ............................... 455/418–419, 455/411, 420, 435, 575, 403, 551, 436, 432–433, 560, 550, 552

(56) References Cited

U.S. PATENT DOCUMENTS

| | | | | |
|---|---|---|---|---|
| 5,159,625 A | * | 10/1992 | Zicker | 455/432 |
| 5,239,680 A | * | 8/1993 | Grube et al. | 455/63 |
| 5,297,192 A | * | 3/1994 | Gerszberg | 455/419 |
| 5,303,287 A | * | 4/1994 | Laborde | 455/436 |
| 5,440,614 A | * | 8/1995 | Sonberg et al. | 455/432 |
| 5,457,737 A | * | 10/1995 | Wen | 455/410 |
| 5,483,465 A | * | 1/1996 | Grube et al. | 455/419 |
| 5,485,505 A | * | 1/1996 | Norman et al. | 379/428 |
| 5,490,200 A | * | 2/1996 | Snyder et al. | 455/420 |
| 5,524,135 A | * | 6/1996 | Mizikovsky et al. | 455/419 |
| 5,546,444 A | * | 8/1996 | Roach, Jr. et al. | 455/422 |
| 5,551,073 A | | 8/1996 | Sammarco | |
| 5,555,192 A | * | 9/1996 | Grube et al. | 455/67.1 |
| 5,577,103 A | * | 11/1996 | Foti | 455/466 |
| 5,600,708 A | * | 2/1997 | Meche et al. | 455/419 |
| 5,603,084 A | * | 2/1997 | Henry et al. | 455/186.1 |
| 5,610,972 A | * | 3/1997 | Emery et al. | 455/426 |
| 5,835,858 A | * | 11/1998 | Vaihoja et al. | 455/419 |
| 6,243,574 B1 | * | 6/2001 | McGregor et al. | 455/418 |
| 6,381,454 B1 | * | 4/2002 | Tiedemann, Jr. et al. | 455/419 |
| 6,397,064 B1 | * | 5/2002 | Bridges et al. | 455/432 |

FOREIGN PATENT DOCUMENTS

| | | |
|---|---|---|
| EP | 0478231 | 9/1990 |
| EP | 0562890 | 9/1993 |
| WO | 9523487 | 8/1995 |

* cited by examiner

Primary Examiner—Charles N. Appiah
(74) Attorney, Agent, or Firm—Philip Wadsworth; Kent D. Baker; Kyong H. Macek

(57) ABSTRACT

A communications network and method for over the air service programming a mobile station (2), where the mobile station transmits a service programming request to a communications network, which results in the mobile station (2) being connected to a customer service center (26). Customer service center (26) queries the user of mobile station (2) for information in response to which the customer service center (26) selects a home location register (18) and authentication center (22) within the communication network with which the mobile station (2) is to be associated. Service programming information associated with the mobile station (2) is transferred from the home location register (18) and/or the authentication center (22) into mobile station (2).

10 Claims, 11 Drawing Sheets

METHOD AND SYSTEM FOR OVER-THE-AIR (OTA) SERVICE PROGRAMMING

CROSS REFERENCES TO RELATED APPLICATIONS

This application is a continuation of Ser. No. 08/728,467 filed Oct. 10, 1996, which claims the benefit of U.S. Provisional application Serial No. 60/005,011, filed on Oct. 10, 1995.

BACKGROUND OF THE INVENTION

1. Field of the Invention

This invention relates to communication systems, more particularly the present invention relates to an approach supporting over-the-air ("OTA") service programming of a mobile station.

2. Description of the Related Art

Conventionally, an activation process for a newly purchased mobile station is a manually intensive and time consuming process. One of the limitation with this conventional activation process is that the user must bring the mobile station to a service center in order to activate the mobile station.

A Mobile Station is a subscriber station in the category of Domestic Public Cellular Radio Telecommunications Service, normally intended to be used while in motion or during halts at unspecified points. The category includes true mobile stations, handheld portable stations, fixed stations, and other devices.

At the service center a technician programs (stores) into the mobile station various parameters which include information that allows the unit to communicate on the network and which define the mobile station's network identity. Optionally, manufacturer specific information may also be programmed into the mobile station. Multiple parameter sets are sometimes provided in a mobile station so that, for example, the mobile station can have local identities in different service areas.

If information stored in a previously activated mobile station needs to be changed, conventionally the process is also manually intensive and time consuming. One of the limitations with this conventional process is that the user must bring the mobile station to a service center in order to have a technician change the information in the mobile station.

SUMMARY OF THE INVENTION

Accordingly, one object of this invention is to provide a novel method to activate a mobile station for use within a communications network without the user having to bring the mobile station to a service center or third party.

Another object of this invention is to provide a novel method to change information in a mobile station for use within a communications network without the user having to bring the mobile station to a service center or third party.

Hereafter, these two objects of this invention, namely to activate a mobile station and to change information within a mobile station without the user having to bring the mobile station to a service center or third party will be referred to as over-the-air service programming (OTASP).

Another object of the present invention is to provide a signaling infrastructure to accomplish the over-the-air service programming of a mobile station for use within a communications network with minimal mobile switching center (MSC) and visitor location register (VLR) involvement.

The above and other objects are achieved according to the present invention by providing a new and improved signaling infrastructure and method for over-the-air service programming of a mobile station for use in a communications network.

According to the invention, the mobile station transmits a message including an over-the-air service programming request, the mobile station identification presently stored in the mobile station and the mobile station's electronic serial number, to a mobile switching center coupled to the communications network. If the mobile station can have multiple identities, as discussed above, the user selects the mobile station identity to be in effect during the over-the-air service programming procedure.

An Electronic Serial Number is a 32-bit number assigned by the mobile station manufacturer, uniquely identifying the mobile station equipment.

The mobile station identification (MSID) can be either the mobile identification number. (MIN) or the international mobile station identity (IMSI). Mobile Identification Number (MIN) is a 34 bit number that is a digital representation of the 10 digit number assigned to a mobile station. International Mobile Station Identity (IMSI) is a number up to 15 digits in length which uniquely identifies a mobile station internationally. In what follows, whenever we refer to a mobile identification number, it is implicit that an IMSI could very well be used in the place of MIN.

This results in the mobile station getting connected to an initial service unit via a voice connection. A Temporary Reference Number (TRN) identifying the mobile switching center and the mobile station is allocated for the mobile station at the mobile switching center. The TRN can be a mobile station identification (MSID), a telephone directory number or any other number.

If the TRN is not an MSID, a unique and temporary mobile identification (MSID) must also be allocated for use during the service programming procedure.

The TRN and, if possible, the temporary mobile station identification (MSID) if one is allocated, the MSID presently in the mobile station, and the electronic serial number are sent to the service unit during voice connection set up. It may not be possible to send MSIDs and the electronic serial number to the service unit since some systems on the voice connection set up path may allow only valid directory numbers or allow only directory numbers assigned to the MSC to be passed.

If it is determined that the initial service unit is not the desired service unit, the voice call gets forwarded to one service unit after another until a desired service unit is reached. The TRN, and possibly the MSID and the electronic serial number, also get sent to the final service unit.

The final service unit selects a home location register within the communications network with which the mobile station is to be associated.

The home location register then gets associated with the mobile switching center by the home location register sending a message containing the TRN to the mobile switching center. The home location register is able to send a message to the mobile switching center because the TRN identifies the mobile switching center. The mobile switching center uses the TRN to identify the mobile station whose over-the-air service programming is being carried on. The mobile switching center sends a message back to the home location register containing the temporary MSID, if one was allocated at the mobile switching center, the MSID presently contained in the mobile station, and the mobile station's electronic serial number, if these were not received at the final service unit during voice call set-up. If the TRN is distinct from the temporary mobile identification number, it is released at the mobile switching center.

Hereafter, information regarding the mobile station contained at any network element is referenced using the temporary MSID, which could be the TRN itself, and the mobile station's electronic serial number.

The service unit or the home location register may query, via the communication network, the mobile station for some information contained in the mobile station. The service unit or the home location register may allocate a new permanent MSID for the mobile station and transfer service programming information, possibly including the newly allocated permanent MSID, into the mobile station via the mobile switching center using the communications network. The service unit also transfers service programming information associated with the mobile station into the home location register.

After the service programming information is successfully transferred to the mobile station, the service unit or the home location register sends a message to the mobile station via the communications network instructing it to transfer the service programming information to its non-volatile memory. The information sent to the mobile station is also stored in non-volatile memory in the HLR and/or authentication center (AC).

The mobile switching center is used merely as a conduit for messaging performed between the home location register and the mobile station and between the service unit and the mobile station.

The home location register includes a database that contains registration and user profile information for the system subscribers. The mobile switching center provides interconnection services among wireless subscriber stations, and between wireless subscriber stations and the public switched telephone network (PSTN) via one or more base stations (BS) under its control. The PSTN is a telecommunications network commonly accessed by ordinary telephones, private branch exchange trunks and data transmission equipment that provides service to the general public. The base station is a fixed station used for communicating with mobile stations. Depending on the context, the term base station may refer to a cell, a sector within a cell, an MSC, or other part of the cellular system.

The method of OTA service programming according to the present invention minimizes the involvement of the MSC and Visitor Location Register (VLR) with OTA processing. The VLR links to one or more MSCs, and includes a database for temporarily storing part of subscription data and, in certain cases, security related data for a mobile station currently served by its corresponding MSC.

The over-the-air service programming process also needs the involvement of the authentication center for the purpose of storing the mobile station's security related data and for performing security related procedures needed for downloading the Authentication-Key (A-Key) to the mobile station and for invoking voice privacy and/or signaling message encryption for security purposes on the air-link between the mobile station and the base station.

The Authentication Center (AC) is an entity that manages the security aspects related to the mobile station. The Authentication-Key is a concealed bit pattern stored in the mobile station and the AC. It is used to generate and update the mobile station's SSD, which is used for authentication, voice privacy and signaling message encryption. Shared Secret Data (SSD) is a bit pattern stored in the mobile station and known by the AC, and possibly by the VLR. Shared Secret Data is maintained during power off.

The service unit interfaces normally with the HLR. Hence communication between the service unit and the AC is generally via the HLR. To accomplish communication between the HLR and the AC, the present invention proposes new messages between the home location register and the authentication center.

Advantageous aspects of OTA service programming according to the present invention include:

1) OTA service programming according to the present invention need not involve the MSC/VLR with the details of service programming as the process is primarily one of initializing the mobile station's and HLR's/Authentication Center's (AC's) databases.

2) By minimizing the MSC/VLR involvement, enhancements to the OTA service programming process can be made without changing MSC and VLR software.

3) The HLR/AC controls the service programming process acting as a Service Control Point (SCP) to control over-the-air service programming.

4) For control, the CSC only needs to interface to the HLR. The voice connection to the CSC may be through the network or direct from the MSC. The method of OTA service programming according to the present invention supports either method.

5) The HLR can be chosen after the activation process begins. This allows the mobile station to activate anywhere within the operator's service area. Given the appropriate agreements and network support, there is nothing to prevent a mobile station from being activated in any HLR having connectivity with the MSC.

6) The MSC is used merely as a conduit for messaging performed between the HLR and the mobile station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
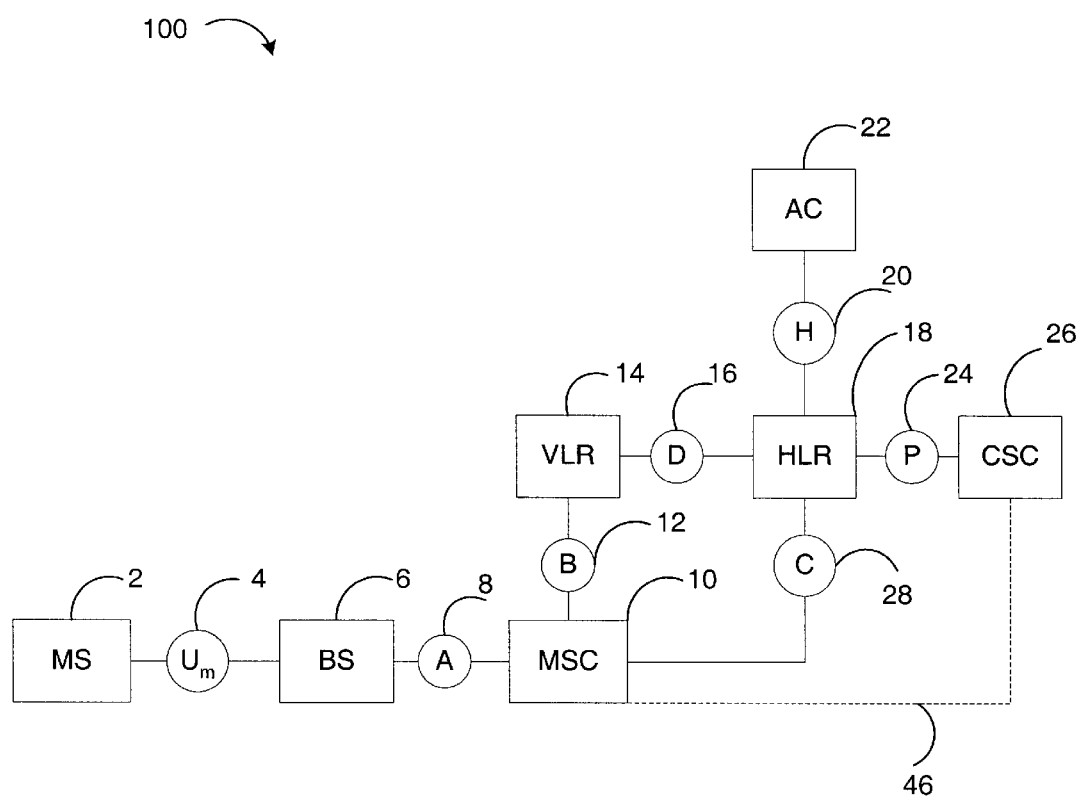
FIG. 1 is block diagram of a network reference model with one HLR and one CSC.

Referring now to the drawings, wherein like reference numerals designate identical or corresponding parts throughout the several views, and more particularly to FIG. 1 thereof, there is illustrated a block diagram of a network reference model 100 according to the present invention. In the description that follows, the network reference model is first explained and is followed by related network models illustrated in FIGS. 2 and 3. Subsequently, FIGS. 4A, 4B and 4D illustrate process steps employed by the network and FIGS. 4C, 5, 6, 7 and 8 illustrate signaling employed in the network.

The network reference model 100 of FIG. 1 includes a mobile station (MS) 2 coupled to a base station (BS) 6 via an interface, $U_m$, 4; the BS 6 is coupled to a mobile switching center (MSC) 10 via an interface, A, 8; the MSC 10 is coupled to a visitor location register (VLR) 14, and a home location register (HLR) 18 via interfaces, B, 12, and C, 28, respectively; the VLR 14 is coupled to the HLR 18 via an interface, D, 16; and the HLR 18 is coupled to an authentication center (AC) 22 and a customer service center (CSC) 26 via interfaces, H, 20 and P (proprietary) 24, respectively. A voice connection is established between the MSC 10 and the CSC 26, as indicated by the dotted line 46. Interfaces A, B, C, D, H and $U_m$ are industry standard interfaces, and are used, for example in the Telecommunication Industry association (TIA) IS41-C standard on Cellular Radiotelecommunications Intersystem Operations. Note that in FIG. 1, there is only one HLR associated with the CSC.

Figure 2:
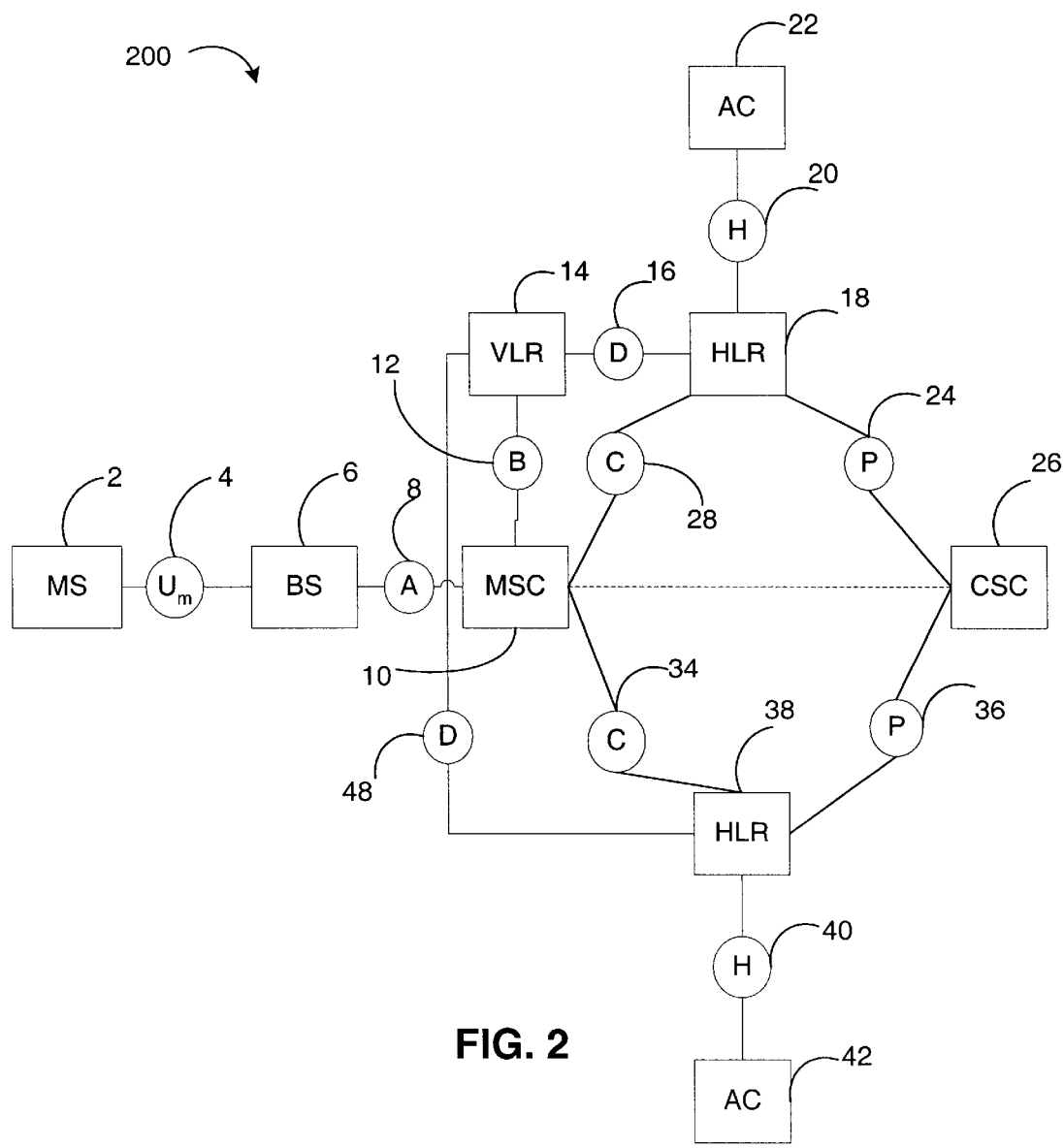
FIG. 2 is block diagram of a network reference model with multiple HLRs and one CSC.

FIG. 2 is a block diagram of a network reference model 200 including multiple HLRs. In addition to the elements of the network reference model 100, the network reference model 200 includes an HLR 38 coupled to the CSC 26, the MSC 10, the VLR 14 and an AC 42 via interfaces P (proprietary) 36, C 34, D 48 and H 40, respectively. FIG. 2 shows a case when there is a choice of HLRs on which the mobile station's data can be stored. In this case, a single CSC is affiliated with the HLRs.

Figure 3:
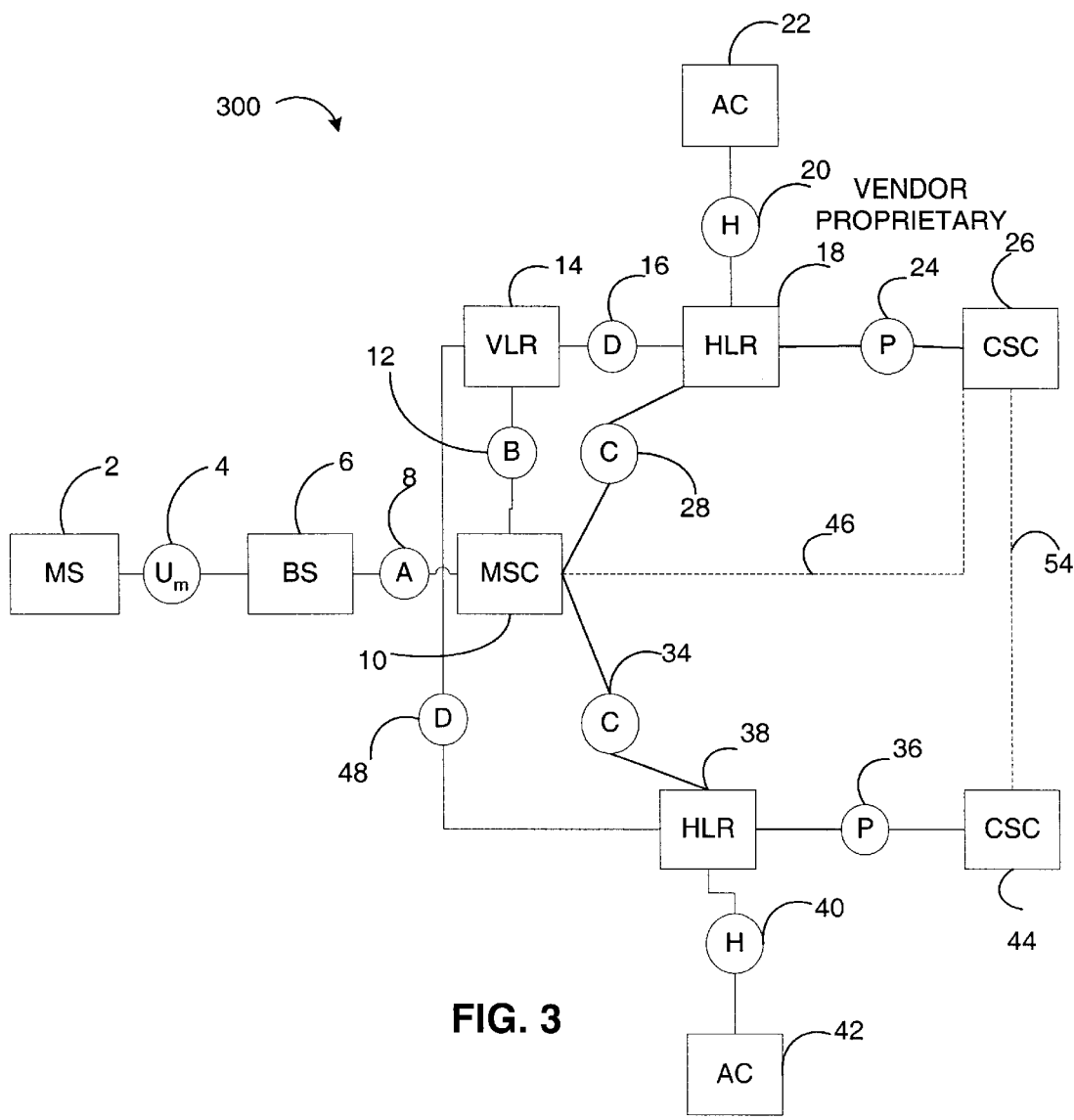
FIG. 3 is block diagram of a network reference model with multiple HLRs and separate CSCs.
Figure 4A:
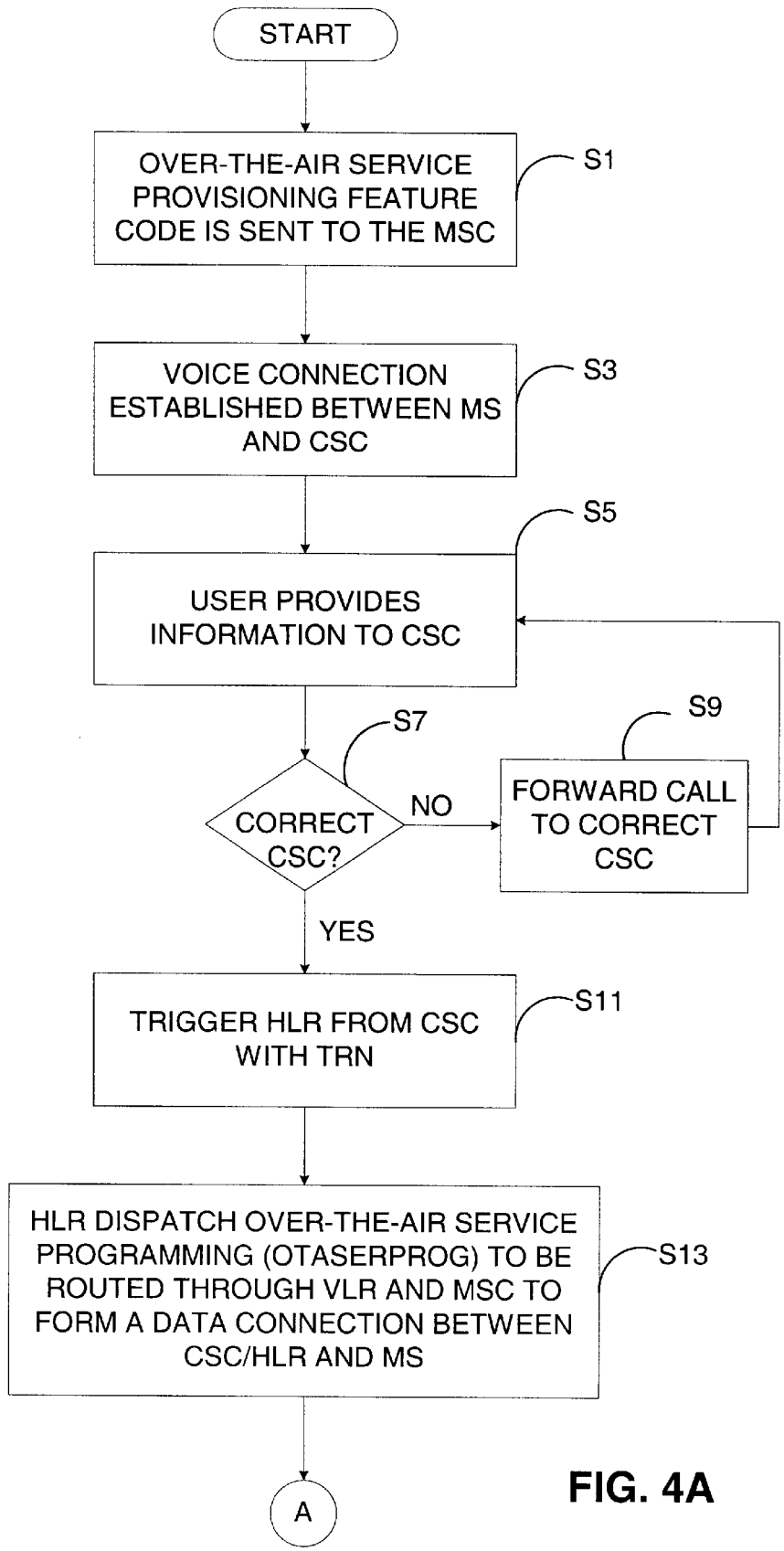
FIG. 4A is a flowchart illustrating a process for programming a mobile using OTA service programming.
Figure 4B:
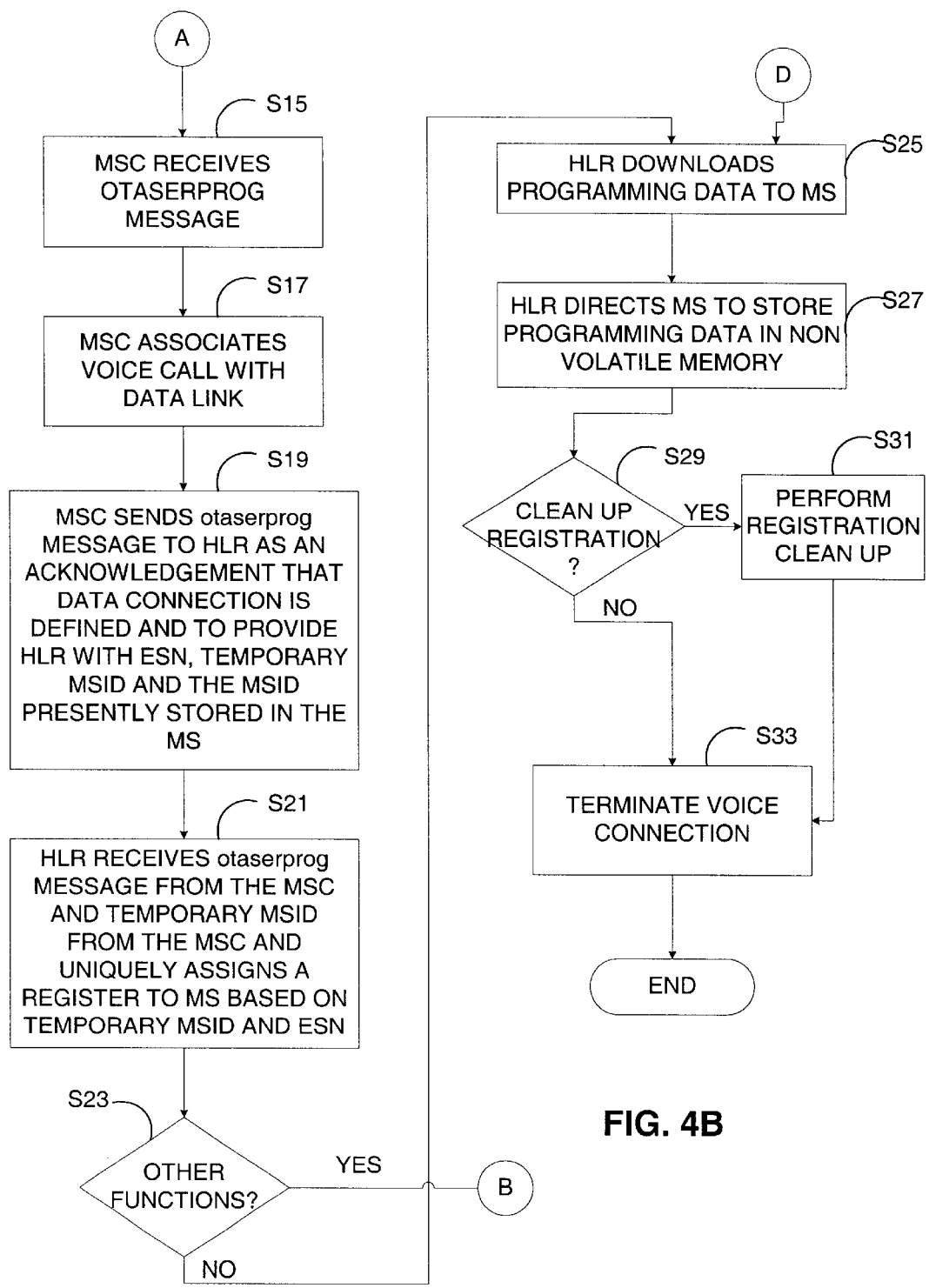
FIG. 4B is a continuation of the flowchart in FIG. 4A.

FIG. 3 illustrates a block diagram of a network reference model 300 including multiple HLRs and CSCs. The network reference model 300 includes the elements of the network reference model 200 with an additional CSC 44 and the voice connection 54. In this figure, HLR 38 is coupled to CSC 44 via interface P 36 and CSC 26 forwards the voice connection 46 to CSC 44 using voice connection 54 in a voice call-forward operation. In FIG. 3, each HLR 18, 38 correspond to a different CSC 26, 44, respectively.

Invocation of over the air (OTA) service programming according to the present invention will first be described with respect to the network architectures shown in FIGS. 1–3. Subsequently, the function and processes performed in accomplishing OTA service programming will be described with respect to FIGS. 4–8.

With reference to FIG. 1, OTA service programming begins with the mobile station (MS) 2 initiating an over-the-air service programming call. The user will initiate this call because, for example, the user has just purchased a mobile telephone from a retail vendor and the user wants to operate the telephone for normal use without having to travel to a service center to activate the phone, or because, the user wants to change information in the mobile station, or because, the service provider instructs the user to place an over-the-air service programming call in order for the service provider to change certain information in the mobile station. To accomplish this, the user inputs an over-the-air service programming code message at the mobile station 2 having a specific preamble, e.g., "*22", which indicates the user wishes to request over-the-air service programming. After the preamble, the user inputs data indicating the system desired. For example, the user enters "XXX" indicating a specific system over which the user wishes to subscribe, such as system A or system B (*22800 or *22801), "YYYY" where "YYYY" is a System Identification number ("SID") of a preferred service provider, or "ZZZZZ" indicative of a Time Division Multiple Access (TDMA) System Operator Code (SOC). Instead of the user manually entering the over-the-air service programming code message on the mobile station, a user may press a button on the mobile station resulting in a similar effect as the one when the user manually enters the over-the-air service programming code message on the mobile station. If the mobile station can have multiple identities as discussed above, the user selects the mobile station identity to be in effect during the OTASP procedure. Through the air interface 4, the mobile station 2's call is passed to the serving MSC 10 via the base station 6 and interface 8. At the same time an electronic serial number (ESN) of the user's mobile station and the MSID presently in the MS get passed to the MSC 10, which the MSC 10 saves.

In response to the mobile station 2's call, the MSC 10 supplies a temporary reference number (TRN), associated with the mobile station 2__and which identifies the MSC, and routes the call to the CSC 26 via voice connection 46. The TRN can be a mobile station identification (MSID), a directory number or any other number. Alternatively, traceable TRNs are used where the CSC can screen the incoming TRN to determine if the TRN is from a valid directory of numbers assigned to the MSC 10. If the TRN is not an MSID, a unique and temporary MSID must also be allocated for use during the service programming procedure.

In the network shown in FIGS. 1 and 2, the call is routed directly to the CSC 26 via voice connection 46, although as shown in FIG. 3, the, call may be forwarded, through call-forwarding, via a second voice connection 54 to a second CSC 44. In either case, the TRN serves as the initial reference for the over-the-air service programming attempt and is supplied to the CSC 26 (or 44) as part of call setup.

The TRN could be hosted in an Integrated Service Digital Network (ISDN) User-to-User element or part or the Calling Party number field, or other suitable means for conveying the number.

Once the call from the MSC 10 arrives at the CSC 26 the CSC responds in the following way. A voice operator (or a voice response unit, etc.) at the CSC 26 will begin a dialog with the user of mobile station 2, during which the CSC 26 will identify (select) which HLR 18 or 38 (in FIGS. 2 and 3) will be used to communicate with the MSC 10 on a data connection to be established between the HLR 18 and MSC 10. For example, a service provider may service both New York and Los Angeles with corresponding HLRs. A user from Los Angeles may wish to program the user's mobile station while visiting New York. In this case, the New York CSC operator may forward the user's call to a Los Angeles CSC operator. If the HLR selected for programming is directly connected to the CSC 26 (FIGS. 1 and 2), the CSC 26 begins the over-the-air service programming by contacting the designated HLR (HLR 18 via proprietary interface 24 or HLR 38 via proprietary interface 36 in FIGS. 1 and 2). The TRN that was supplied by the MSC 10 is provided to the designated HLR via CSC 26, where the CSC 26 triggers the designated HLR to establish a data connection (through VLR 14 and interfaces 16 and 12) to MSC 10. In FIG. 1, the data connection includes the HLR 18, interface 16, VLR 14 interface 12 and MSC 10. In FIG. 2, if HLR 18 is the desired HLR, the data connection is the same as FIG. 1. In FIG. 2, if HLR 38 is the desired HLR, the data connection includes HLR 38, interface 48, VLR 14, interface 12 and the MSC 10. In FIG. 3, if the HLR 38 selected for over-the-air service programming is not directly connected to the CSC 26, then the CSC 26 forwards the call to CSC 44 which is connected to HLR 38 and selected for over-the-air service programming via a voice connection 54. The TRN that was assigned by the MSC 10 must be forwarded to CSC 44. By call forwarding, the mobile station 2 can be serviced on any HLR which supports the OTASP procedures. In FIG. 3, the data connection includes the HLR 38, interface 48, VLR 14, interface 12 and MSC 10.

Once the designated HLR (18 or 38) has been triggered by the CSC 26 (in FIGS. 1 and 2), or HLR 38 by CSC 44 (in FIG. 3), the HLR establishes a data connection to the MSC 10 based on the TRN provided to the HLR from the CSC. The HLR 18 is configured to identify the MSC's address from the TRN, and because the HLR 18 usually stores records based on a mobile station's ESN and MSID, the HLR requires the mobile station's ESN and the temporary MSID from the MSC in order to store a record for the mobile station 2. The HLR also requires the MSID that is presently in the MS for use in SSD update procedures as will be explained later. Accordingly, the designated HLR contacts the MSC 10 via the data connection, in order to retrieve the mobile station 2's ESN, the MSID that is presently in the mobile station and the temporary MSID, if distinct from the TRN. We are assuming that the temporary MSID, the MSID presently stored in the MS and the ESN were not communicated to the CSC during the voice call set up and hence need to be retrieved from the MSC. As will be described in reference to the following flow charts and call diagrams, the data connection is then associated with the mobile station 2, and once associated, the CSC 26 (or 49) may pass data to the mobile station 2 and program the mobile station.

FIG. 4A is a flowchart of the steps performed to functionally accomplish the inventive OTA service programming process. The process beings at step S1 where in order to place the over-the-air service provisioning call the user, following an instruction manual provided with the telephone, dials the activation code preamble ("*22") followed by the appropriate three to five digit extension, discussed earlier, corresponding with a specific system, SID, or TDMA SOC. During this step, the mobile station 2 transmits the over-the-air service programming request, the MSID that is presently in the mobile station and its unique ESN to the MSC, where the MSC stores the mobile station 2's ESN and the MSID that is presently in the mobile station. The MSC allocates a Temporary Reference Number (TRN) identifying the mobile switching center and the mobile station. If the TRN is not an MSID, a unique and temporary MSID is also allocated for use during the service programming procedure.

The process then proceeds to step S3 where the MSC servicing the mobile station 2 establishes a voice connection 46 between the mobile station 2 and the appropriate CSC (e.g., CSC 26 in FIG. 1).

After the voice connection is made, the process proceeds to step S5 where the user provides user-specific information (such as residence address, credit card number, etc.) to a CSC operator at the CSC 26. In light of the user-specific information, the process flows to step S7 where the CSC 26 determines whether it is the correct CSC to service the user (e.g., CSC 44 of FIG. 3 may be the correct CSC). If not, the process proceeds to step S9 where the mobile station 2's call is forwarded to a correct CSC (e.g., CSC 44 in FIG. 3) and the process then flows to step S5. However, if in step S7 it is determined that the user is connected with the correct CSC (e.g., CSC 26 in FIG. 1), the process flows directly to step S1.

In steps S3 and S9, the TRN is provided from the MSC 10 to the CSC 26, in the form of data, through the voice call set up procedure for the voice connection 46. The TRN is unique to the call being made and is used by the CSC 26 and MSC 10 as a transient (temporary) identifier of the mobile station 2's request for over-the-air service programming. Attributes of the TRN include (1) mobile station identifiability which permits the CSC to identify the mobile station in question, and (2) MSC addressability which permits other network resources, such as the HLR, to uniquely identify the MSC servicing the mobile station 2 by the TRN.

Up to this point in the process, a voice call and a TRN have been established, but a data connection which will enable OTA programming data to be downloaded to the mobile station 2 has not been established. Accordingly, after step S7, the process proceeds to Step S11 where the CSC (26 or 44) triggers HLR (18 or 38) over a proprietary link (P) with a message including the TRN. Based on the MSC addressability attribute of the TRN, the HLR (18 or 38) is able to ascertain the address of the MSC 10 servicing the mobile station 2.

The process then proceeds to step S13 where the HLR 18 dispatches a new over-the-air service programming INVOKE message, OTAServiceProgramming INVOKE (OTASERPROG) to the MSC 10 via VLR 14 (see FIGS. 1, 2 and 3). The OTASERPROG message is communicated through the VLR 14 because, by industry convention, communications from HLRs are typically routed through VLRs. Alternatively, however, the HLR (18 or 38) could dispatch the OTASERPROG message directly to the MSC 10. The combination of the HLR (18 or 38), VLR 14 and MSC 10 (along with the corresponding interconnecting interfaces) form a data connection between the CSC (26 or 44) and the MSC 10 that parallels the on-going voice connection 46 (or 46 and 54) between the mobile station 2 and the CSC (26 or 44). This data link will later be used to communicate service programming data between the mobile station 2 and the HLR 18 (or 38). After the step S13, the process proceeds to step S17 which is shown in FIG. 4B.

FIG. 4B is a flowchart that shows additional steps to the process started in the flowchart of FIG. 4A. After step S15 (FIG. 4A), the process flows to step S15 where the MSC 10 receives the OTASERPROG message. In step S17, the MSC 10 associates the voice connection (call) with the data connection (e.g., as shown in FIG. 1, the data connection being between HLR 18, interface 16, VLR 14, interface 12, and MSC 10) using the TRN supplied to it in the OTASERPROG message.

Up to this point in the process, a data connection has been established between the mobile station 2 and the HLR 18 (or 38), but the HLR 18 (or 38) does not yet have the specific information about the mobile station 2 in order to properly activate the mobile station 2. If the HLR 18 (or 38) (cooperating with the authorization center AC 22 (or 42) were to program the mobile station 2 without more information, the following two problems would arise: first, "pirated" mobiles could obtain access to the communications system, because there has not yet been any accountability made of the mobile station's ESN; and second, the HLR 18 (or 38) requires a mobile's MSID and ESN in order to uniquely create and retrieve HLR 18 (or 38) records corresponding to the mobile station 2. Also, the AC needs the MSID presently stored in the mobile station for use in SSD update procedure as will be explained later.

Accordingly, after step S17, the process proceeds to step S19 where the MSC 10 sends an OTAServiceProgramming RETURN RESULT (otaserprog) message to the HLR 18 (or 38) through the data connection, where the otaserprog message includes the mobile station 2's ESN, the MSID presently stored in the mobile station, and the temporary MSID if allocated at the MSC 10. If the temporary MSID was allocated at the MSC, the TRN is no longer needed and is released. Hereafter, all data communications relating to the mobile station 2 is referenced by the temporary MSID (which could be the same as the TRN) and the ESN. Note that a convention used herein for identifying originating (INVOKE) messages uses UPPER CASE letters, and response (RETURN RESULT) messages use lower case letters (compare OTASERPROG, and otaserprog).

The process then proceeds to step S21 where the HLR 18 (or 38) receives the otaserprog message containing the mobile station 2's ESN, the MSID presently stored in the mobile station, and the temporary MSID. The combination of the ESN and the temporary MSID provide all the information required for the HLR 18 to keep a record for the mobile station 2, and to communicate with the mobile station 2, via the data connection. The MSID presently stored in the mobile station is saved at the HLR for later use if SSD update procedures are performed. We are assuming that the temporary MSID, the MSID presently stored in the mobile station and the ESN were not communicated to the CSC during voice call set up and hence need to be retrieved from the MSC.

After step S21, the process flows to step S23 where the HLR 18 (or 38) determines whether other OTA services are to be performed for the mobile station 2. If so, the process flows to the process shown in the flowchart of FIG. 4D, and later returns to step S25. If no other functions are to be performed, as determined in step S23, the process flows to step S27. In step S25, the HLR dispatches an OTA Data message, in OTASERPROG message, in which data required for service programming the user's mobile station 2 telephone (e.g., permanent MSID) is passed through the data connection and received by the mobile station 2. The OTA Data message is the message that gets communicated between the MS 2 and the MSC 10. Subsequently, a second OTA message (in step S27) is sent to the mobile station 2, in OTASERPROG message, directing the mobile station 2 to transfer service programming data has been sent to the mobile station 2 to its non-volatile memory. In step S29, where the MSC 10 determines whether the mobile station 2 is to be deregistered (i.e., have the MSC/VLR, 10/14, serving system remove the mobile station 2's MSID from the serving system's registers). If the mobile station 2 is not to be deregistered, the process proceeds forward to step S33 of FIG. 4B. However, if the mobile station 2 is to be deregistered, the process proceeds to step S31 where a deregistration process is performed (which will be explained with reference to FIG. 5). Once the deregistration process is performed, the process proceeds to step S33.

Then, in step S33 the mobile station 2 terminates the voice connection with the CSC and the process ends.

Figure 4C:
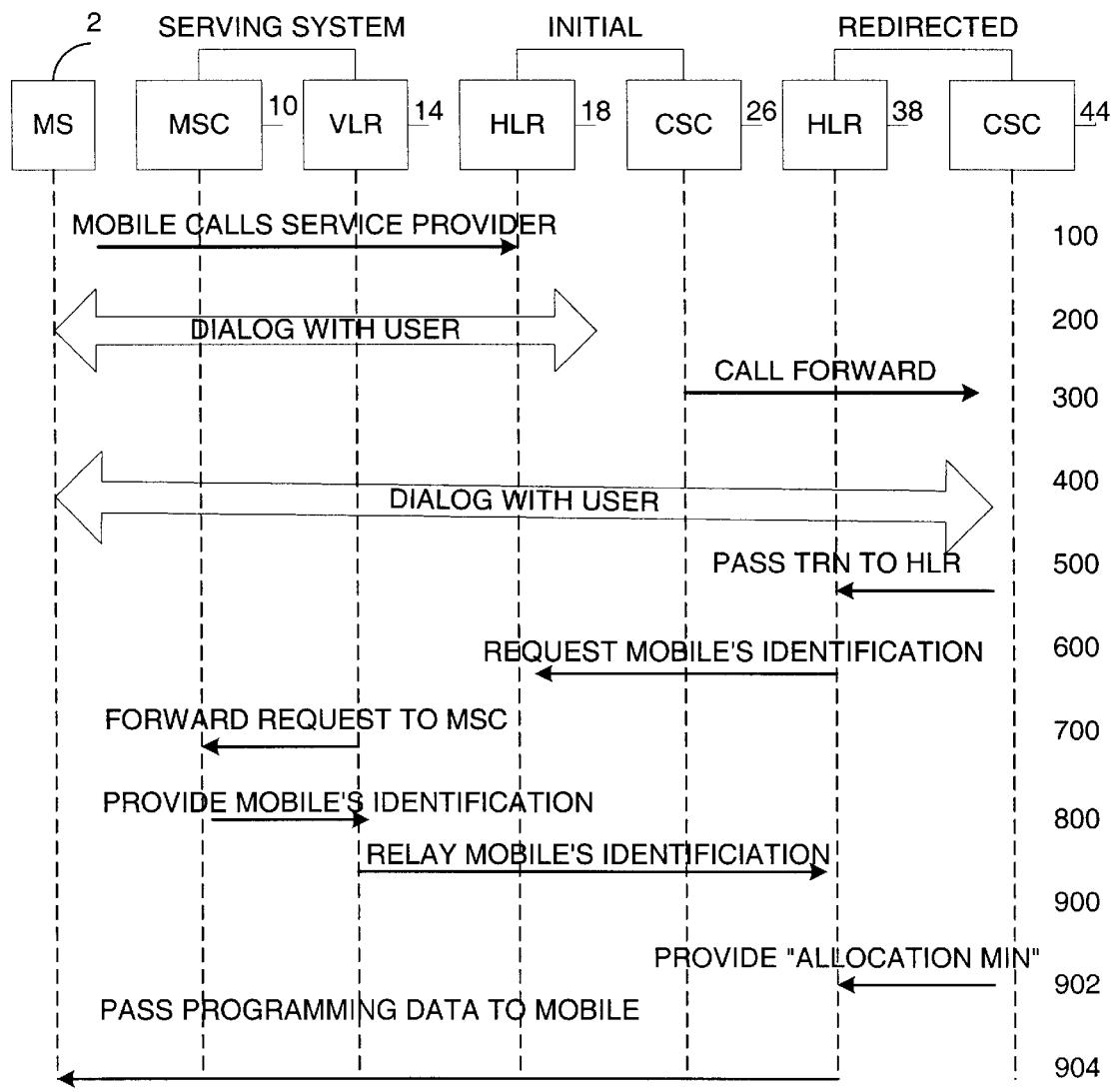
FIG. 4C is a call flow diagram showing signaling in an exemplary communications network in which an original voice connection is call forwarded from a first CSC to a second CSC.
Figure 4D:
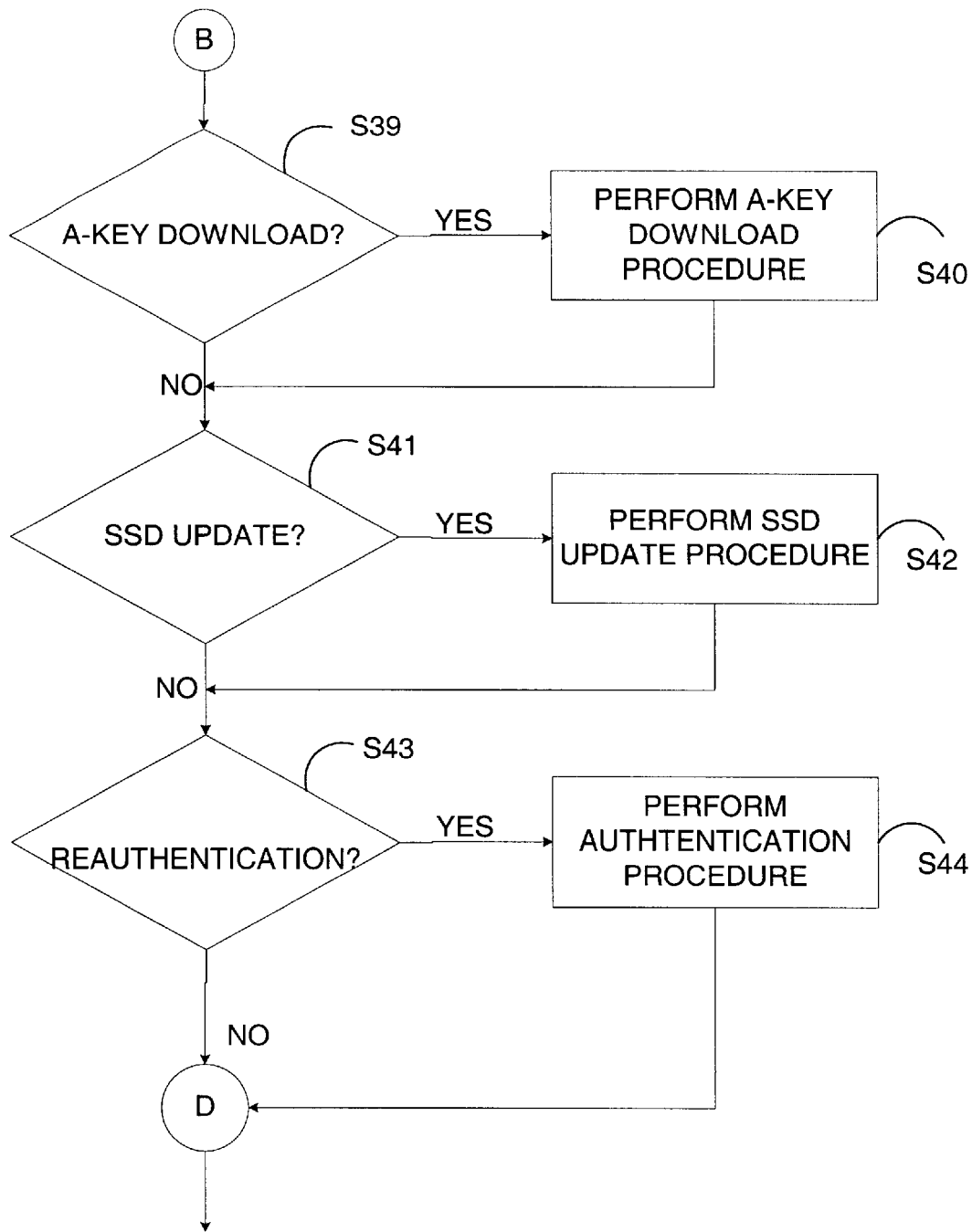
FIG. 4D is a continuation of the flowchart in FIG. 4B.
Figure 5:
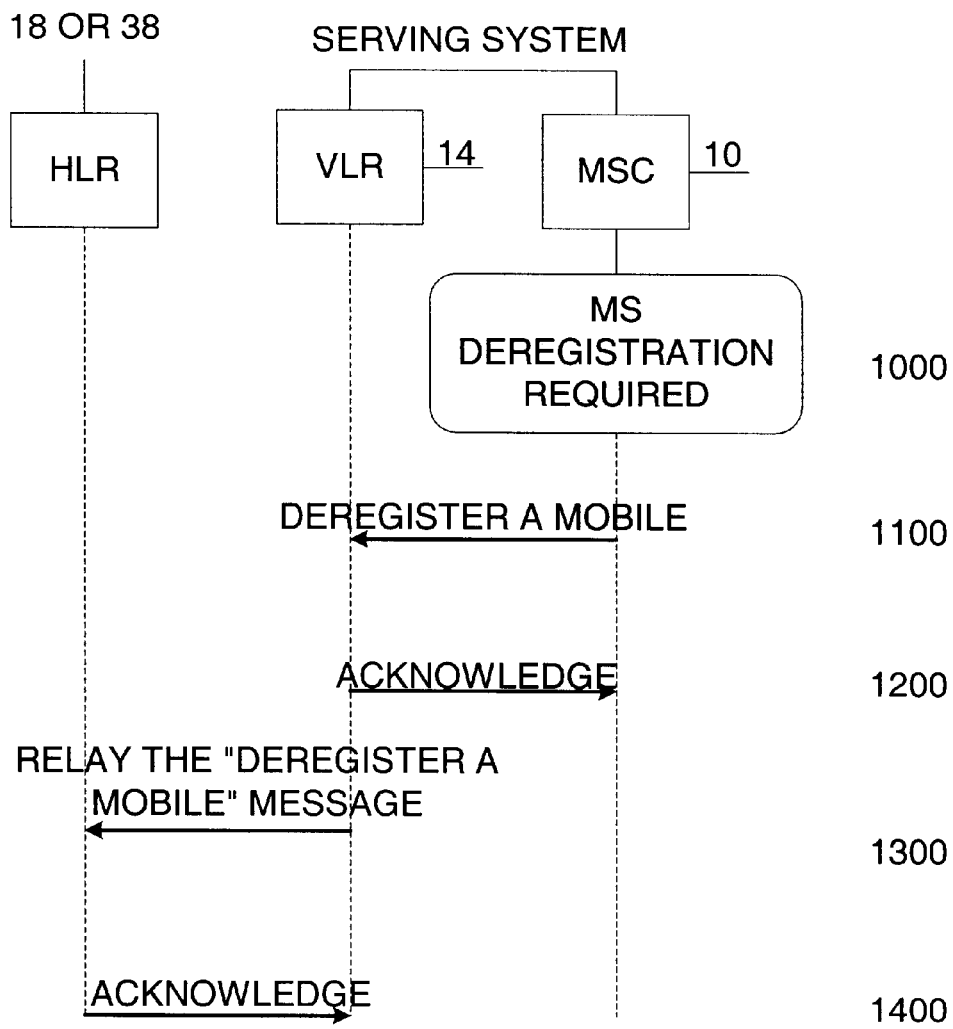
FIG. 5 is a call flow diagram showing signaling for deregistering an old MSID associated with a mobile unit according to the present invention.

FIG. 4C is a call flow diagram using the OTASERPROG and otaserprog messages and which corresponds to the process described in the flowcharts of FIGS. 4A and 4B. As discussed above, the present invention contemplates that the VLR 14 and MSC 10 are used primarily as conduits for message transfer between the mobile station 2 and the HLR/AC 18/22 (or 38/42), and need not play an active role in the mobile station 2 service programming process. This is achieved through definition of a novel (OTASERPROG) INVOKE and RETURN RESULT message, within which the OTA Data message, which is the message communicated between the MSC and the MS containing OTA Service Programming related information, can be encapsulated. The OTASERPROG message is sent from HLR 18 (or 38) or the AC 22 (or 42) to MSC 10. If an encapsulated OTA Data message is present, it will generally be extracted by the MSC 10 from the OTASERPROG INVOKE message sent from the HLR 18 (or 38) or the AC 22 (or 42) to the MSC 10.

The otaserprog message is sent from the MSC 10 to the HLR 18 (or 38) or the AC 22 (or 42). If an OTA Data message is to be sent to the HLR or the AC, it is encapsulated by the MSC 10 in the OTASERPROG RETURN RESULT message sent from the MSC 10 to the HLR 18 (or 38) or the AC 22 (or 42).

That is, the over-the-air service programming process may advantageously be performed without substantive involvement of any processing resources of the VLR/MSC (14/10).

Apart from communicating OTA Data messages between the MS and the HLR or the MS and the AC, the OTASERPROG INVOKE and RETURN RESULT messages being also used for other purposes such as "Attaching the MSC with the HLR via a Data Connection" and Sending Encryption Parameters to the MSC.

Although for completeness, the call flow diagrams of FIG. 4C (as well as the other flow diagrams) depict message transfer to and from the VLR/MSC, it is to be understood that the system according to the present invention does not contemplate that processing or control functions are performed within the VLR/MSC during the OTASP process.

In FIG. 4C (as well as the other call flow diagrams) general descriptive legends are provided with respect to the specific calls. In these figures, the dashed arrows represent a voice or traffic channel.

The structure of the call flow diagrams is described with reference to FIG. 4C. The top portion of FIG. 4C corresponds to the MS 2, MSC 10, VLR 14, HLR 18, CSC 26, HLR 38 and CSC 44 which are also shown in FIG. 3. The MSC 10 and VLR 14 jointly form a serving system which serve the MS 2 in the MS's present geographic location. The HLR 18 and the CSC 26 jointly form an initial home service ("initial"), but are replaced by redirected home service ("redirected") by forwarding the mobile station 2's voice call, as will be described, to the redirected home service. Along the right hand portion of FIG. 4C labels (steps) indicative of steps in the signaling procedure.

Referring to step 100 in FIG. 4C, a call is delivered from the mobile station 2 ("MS 2") to the CSC 26 at step 100, which corresponds with steps S1 and S3 of FIG. 4A. In step 200, (step S3 of FIG. 4A), an operator at the initial CSC 26 receives the call and begins a dialog with the user of the mobile phone. During the CSC operator's conversation with the user, the operator determines that the user should be assigned to the redirected HLR 38 and redirected CSC 44, S5 and S7 of FIG. 4A. Accordingly, in step 300 the CSC operator initiates a call-forwarding operation (step S9 in FIG. 4A) where the mobile station 2's call is forwarded to the redirected HLR 38 and the redirected CSC 44. During this call forward operation, the TRN received at the first CSC 26 from the MSC 10 is sent to the redirected CSC 44. Then, at step 400, the mobile station 2's user speaks with the CSC operator at the redirected CSC 44 and provides the redirected CSC operator with requisite information for establishing a service for the user's mobile station.

At step 500, the CSC 44 contacts (triggers, step S11 in FIG. 4A) the HLR 38 over the proprietary interface 36 (FIG. 3) and transfers the TRN to the HLR 38. With the TRN, the HLR derives the address of the MSC 10 based on the identifiability attribute associated with the TRN.

At step 600, the HLR 38 transfers the TRN and an Action Code in an OTAServiceProgramming INVOKE message, OTASERPROG(TRN, ActionCode), to the VLR 14, which simply forwards the same message in step 700 to the destination MSC 10. (Steps 600 and 700 correspond with step S13 of FIG. 4A). The OTASERPROG message contains at least two fields including an action code field (ActionCode) and a TRN field. Data in the action code field is interpreted by the MSC 10 as "Attach the MSC with the HLR via a data connection". A value representative of the TRN is contained in the TRN data field and is used by the MSC to associate the correct MS with the data connection (i.e., HLR 38, VLR 14, and MSC 10), see steps S15 and S17 of FIG. 4B.

The MSC 10 responds to the HLR's 38 request by issuing a OTAServiceProgramming RETURN RESULT message, otaserprog (Temporary MSID, ESN, MSID presently stored in the mobile station), see step S19 of FIG. 4B. The otaserprog message effectively reports the mobile station 2's identification to the HLR 38 in the form of an ESN and the MSID presently stored in the mobile station and also sends the temporary MSID to the HLR.

At step 900, the VLR 14 relays the temporary MSID, the MSID presently stored in the mobile station and ESN to the HLR 38, where it is received by the HLR 38. We are assuming the temporary MSID, the MSID presently stored in the MS and the ESN were not communicated to the CSC during the voice call set up and hence need to be retrieved from the MSC. Having the temporary MSID and the mobile station's ESN, the HLR 38 is then free to keep a record of the mobile station 2's programming data and can send relevant portions of the programming data to the mobile station 2 via an OTA Data message sent encapsulated to the MSC in an OTASERPROG message, which is shown as step 904 (step S25 in FIG. 4B). As discussed above, once the programming data has been downloaded to the mobile station 2, the mobile station 2 is instructed by the HLR to store the programming data, in non-volatile memory. The voice call with the redirected CSC 44 gets terminated. As a result, over-the-air service provisioning of the mobile station is accomplished. The information programmed in the MS is also stored in non-volatile memory in the HLR and/or AC.

An alternative call flow is to have the CSC 44 assign a temporary MSID at step 500, in which case the HLR 38 would include the TRN and temporary MSID in the OTASERPROG message sent to the MSC 10. In response, the MSC 10 would send back an ESN and the MSID presently stored in the MS at steps 800 and 900.

Returning to the "other functions" discussed earlier with respect to step S23 of FIG. 4B, FIG. 4D is a flowchart of the process steps for handling "other functions". The relationship between FIGS. 4B and 4D is that if in step S23 of FIG. 4B, it is determined that "other functions" are to be performed before the over-the-air service provisioning process proceeds further, the process flows from step S23 to step S39 in FIG. 4D. If no "other functions" are to be implemented, the process proceeds to step S25 as shown in FIG. 4B. "Other Functions" as implemented in the present invention are explained with reference to FIG. 4D and FIGS. 6, 7 and 8.

FIG. 4D is a flowchart of a process that is a continuation of the process shown in FIG. 4B. In step S39 CSC 26 (or HLR 18) determines whether an A-Key download procedure (to be described with reference to FIG. 6) is to be performed, and performs the A-key download procedure in step S40, and then proceeds to step S41. If it is determined in step S39 that no A-key download procedure is to be performed, the process flows to step S41, which inquires whether an SSD update procedure (to be described with reference to FIG. 7) is to be performed. If so, the process proceeds to step S42 where the SSD update procedure is performed, and the process proceeds to step S43. If it is determined in step S41 than no SSD update procedure is to be performed, the process proceeds to step S43, where an inquiry is made regarding whether a reauthentication procedure (to be described with respect to FIG. 8) is to be performed. If so, the process proceeds to step S44, where the reauthentication procedure is performed. Otherwise, the process returns to step S25 in FIG. 4B. If A-Key download is performed, and if voice privacy and/or message encryption is desired, SSD update necessarily precedes the reauthentication procedure. Each of the A-key download procedure, SSD update procedure, and Reauthentication procedure are described in more detail below.

Since the AC and the HLR can be separate from each other, the following discussion with respect to AC procedures presumes an AC that is separate from the HLR.

There are four operations that involve the AC:
1) Generating the A-key and transferring it to the mobile station (in what follows we implement the Rivest-Shamir-Adleman (RSA) method for A-Key Download, other methods for A-Key Download could be used as well);
2) Updating SSD;
3) Generating the VPMASK and SMEKEY; and
4) Storing the A-key and SSD into non-volatile memory.

There are several issues which must be addressed:
1) Where the authentication and A-key transfer related operations are initiated, the approach according to the present invention is to have them done in the AC. Thus, the HLR does not receive the A-key, the decryption exponent, or the product of the primes P and Q.
2) Where the OTA Data Messages are generated for the A-key transfer, according to the present invention the message is generated in the AC, encapsulated, and passed either directly or through the HLR to the MSC/VLR . Alternatively, the parameters are generated in the AC and passed to the HLR where the OTA Data Messages are formed. The former approach is preferable.
3) Whether the CSC directly interfaces with the AC, or through the HLR, according to the present invention the HLR is in control and thus, the CSC essentially only interfaces with the HLR.
4) The AC needs to be triggered by the HLR to generate the appropriate OTA Data Messages. Similarly, the AC needs to inform the HLR when the AC has completed its action.

Figure 6:
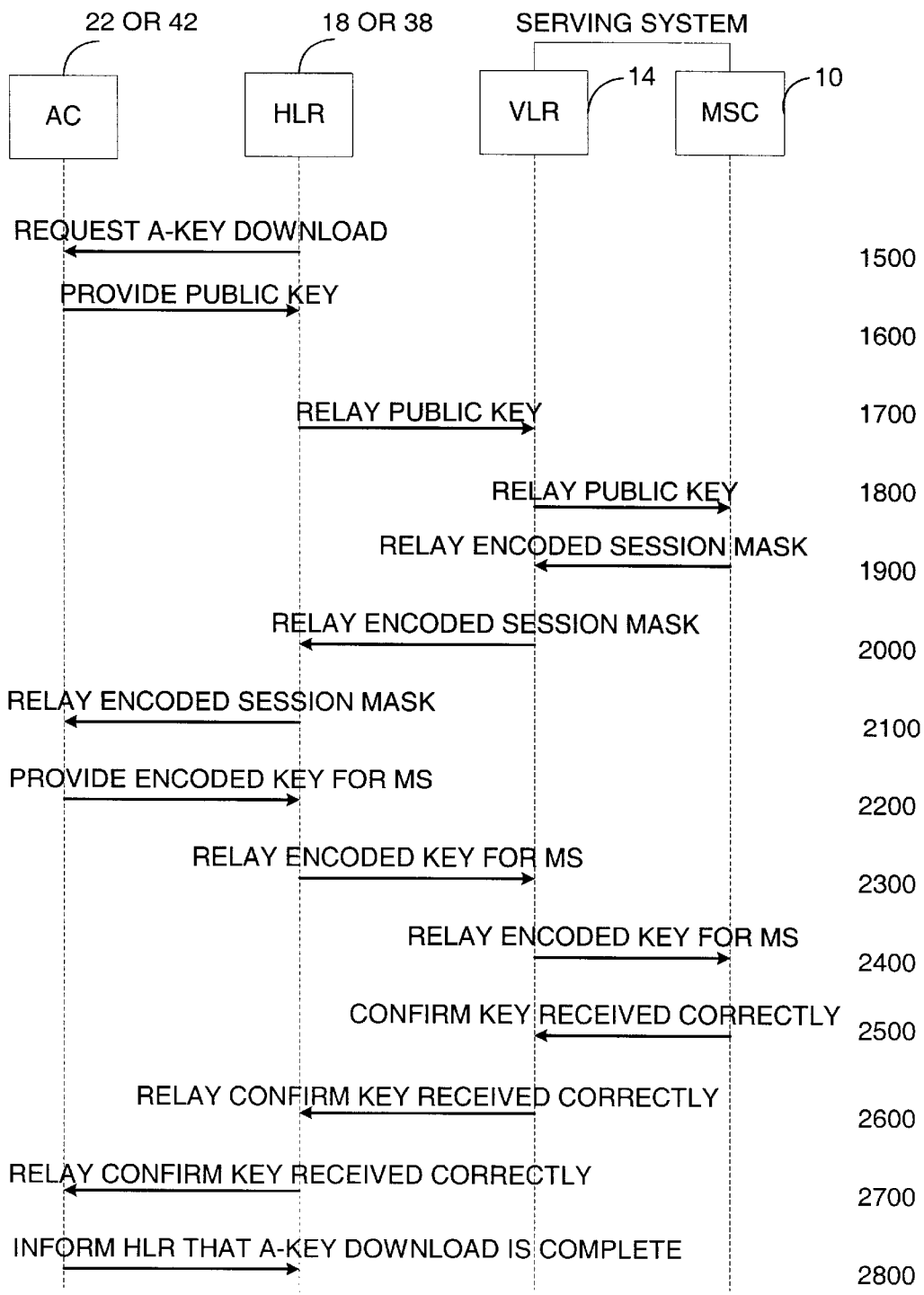
FIG. 6 is a call flow diagram showing an A-Key transfer procedure according to the present invention.

The A-Key Download procedure according to the present invention is described with reference to FIG. 6. In FIG. 6, at step 1500, the new IS-41 AuthenticationCenterDirective INVOKE message, ACDIR (temporary MSID, ESN, ACACTION) is generated by the HLR 18 or 38 and sent to the AC 22 or 42. This INVOKE message according to the present invention contains the ACACTION field directing the AC 22 to perform an A-key download for the subject mobile station 2 (FIG. 1). The mobile station 2 is identified by values included in the temporary MSID and ESN data fields of the ACDIR message.

At step 1600, the AC 22 (or 42) transfers the temporary MSID, ESN and a public encryption key generated at the AC, in an OTA Data Message, OTASERPROG[MIN, ESN, OTA Data Message] message, to HLR 18 (or HLR 38) via an OTAServiceProgramming INVOKE message. The OTASERPROG message gets forwarded from the HLR to the MSC via the VLR. At the MSC, the OTA Data message containing the public encryption key gets sent to the mobile station. Once the mobile station 2 is in possession of the public encryption key, it uses it to encode a session mask which it transmits to the MSC in an OTA Data Message.

At step 1900, MSC 10 responds via the OTAServiceProgramming RETURN RESULT message, otaserprog [OTA Data Message] containing the encoded session mask within the OTA Data Message. The otaserprog message is relayed to the AC in steps 2000 and 2100.

The AC decodes the session mask since it has the public encryption key and other parameters used to compute the public encryption key. The_AC selects an A-Key, encodes it using the session mask. At step 2200, the AC 22 (or 42) transfers the temporary MSID, ESN and the OTA Data Message containing the encoded A-Key in the OTAService programming INVOKE message, OTASERPROG (temporary MSID, ESN, OTA Data message) to the HLR. Steps 2300 and 2400 relay the AC's encoded A-Key to the mobile station 2. The MS is able to decode the A-Key since it has the session mask that was used by the AC to encode the A-Key.

At step 2500, the MSC 10 transfers from the mobile station 2 an OTA Data Message containing a confirmation that the A-Key was successfully received in an OTADataMessage, in an OTAServiceProgramming RETURN RESULT message, otaserprog[OTA Data Message]. In steps 2600 and 2700 the mobile station 2's confirmation is relayed to the AC.

At step 2800, the AC 22 (or 42) sends an empty AuthenticationCenterDirective RETURN RESULT to HLR 18 (or 38) as an acknowledgment to the HLR 18 (or 38) that HLR's request to invoke an A-key download in step 1500 has now been completed.

The SSD-Update procedure according to the present invention is described with reference to FIG. 7. The exemplary procedure and signaling scheme shown in FIG. 7 corresponds to the case in which SSD is not shared. Since the CSC may not actually decide to commit to the parameters that have been downloaded into the mobile station 2, it is preferable that the SSD not be shared during an SSD update while OTA service programming. Nevertheless, sharing SSD could be used. Note that significant modifications to IS-41-C are not required to implement the SSD Update procedure according to the present invention. The AC is triggered by the HLR to perform SSD-Update and the HLR is informed by the AC at the conclusion of the SSD Update procedure.

Figure 7:
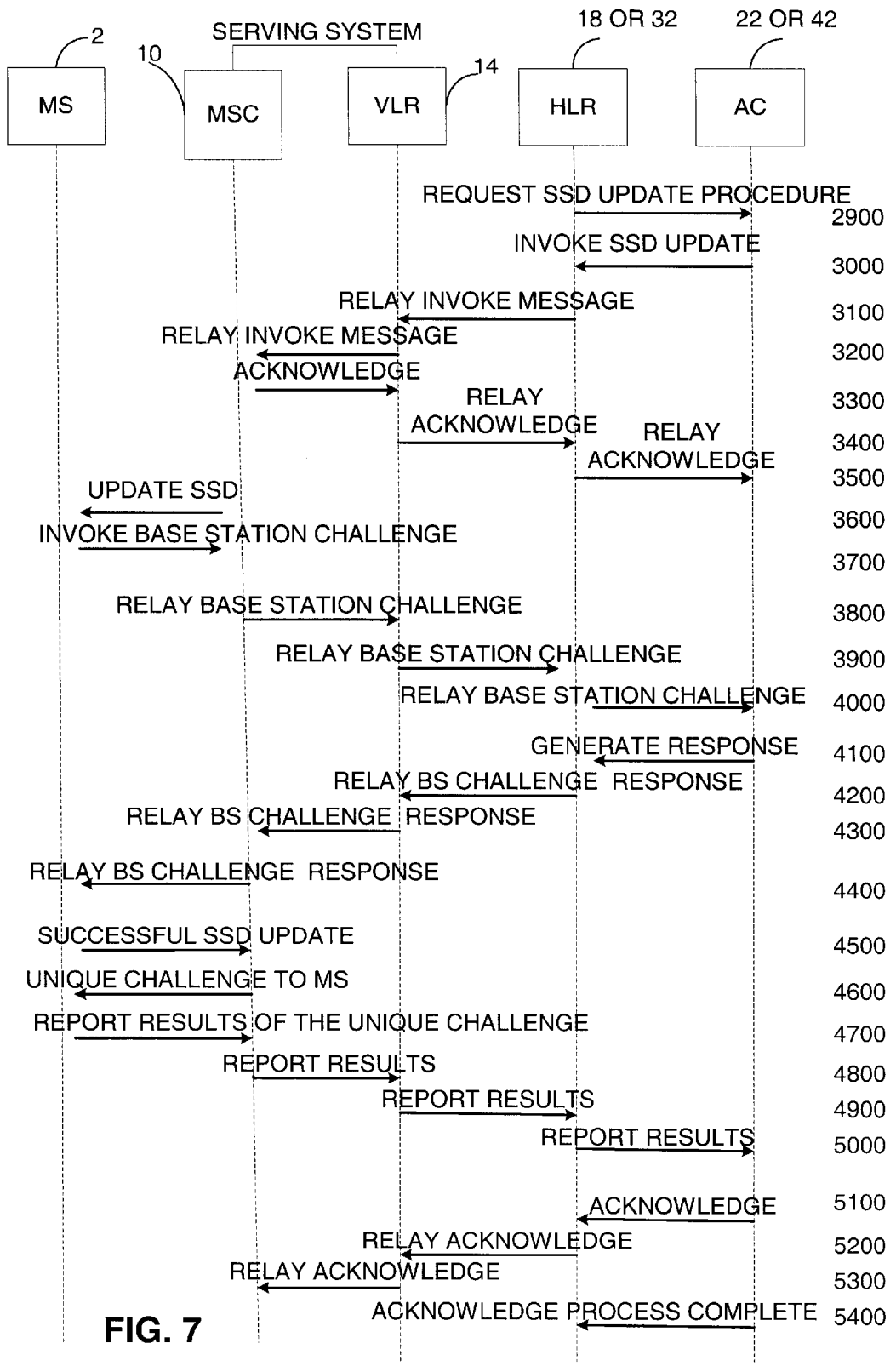
FIG. 7 is a call flow diagram showing an SSD update procedure according to the present invention.

Step 2900, of the call flow diagram of FIG. 7, shows a new IS-41 AuthenticationCenterDirective INVOKE message, ACDIR[temporary MSID, ESN, ACACTION, MSID presently in MS], according to the present invention that is transmitted from the HLR to the AC to request an SSD update procedure be performed. The message contains an ACACTION field which directs the AC 22 (or 42 if HLR 38 is selected) to perform an SSD update. The SSD update operation can be commenced immediately after the A-key was downloaded to the mobile station. Steps 3000–5300 are similar to those that exist for SSD Update procedure in IS41-C. Note that the MSID frequently stored in the MS is sent to the AC for use in computing the Authentication Response to a base station challenge from the MS. Base station challenge procedure forms part of the SSD update procedure.

At step 5400, HLR 18 (or 38) sends an empty AuthenticationCenterDirective, acdir[ ], message to AC 22 (or 42) as an acknowledgment, completing the SSD Update Procedure.

Re-authentication for enabling Voice Privacy, Message Encryption or both, according to the present invention, are accomplished as follows.

Figure 8:
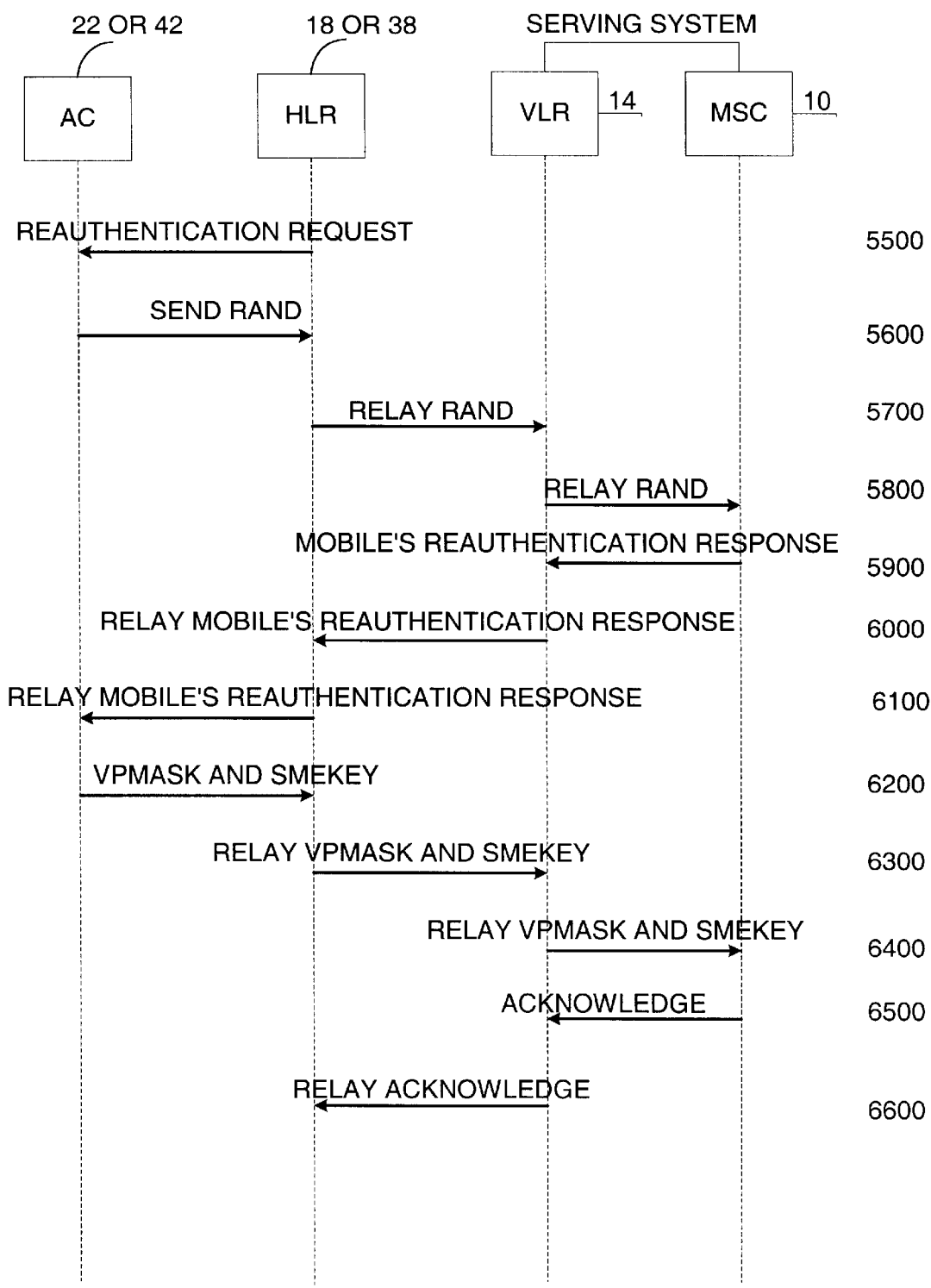
FIG. 8 is a call flow diagram showing a re-authentication procedure according to the present invention.

Re-Authentication according to the present invention is implemented through the call flow illustrated in FIG. 8. In this figure, at step 5500, the new IS-41 message AuthenticationCenterDirective, INVOKE, ACDIR [temporary MSID, ESN, DGTSDIAL, ACACTION], contains the ACACTION field directing the AC 22 (or AC 42 if HLR 38 is selected) to perform the re-authentication procedure. Also included in the message are the temporary MSID, ESN and DGTSDIAL parameters (digits dialed by the mobile station).

At step 5600, the AC 22 (or 42) transfers an OTA Data Message containing a Random Number (RAND) to HLR 18 (or HLR 38 if selected) via the OTAServiceProgramming INVOKE message, OTASERPROG[OTA Data Message], which will ultimately be received by the MSC 10. Steps 5700 and 5800 relay the message to the MSC 10. At the MSC 10, the OTA Data Message containing RAND is sent to the mobile station. The mobile station computes an Authentication Response (AUTHR) and includes it along with other parameters in an OTA Data Message to the MSC 10.

At step 5900, MSC 10 responds to the AC's message by sending the OTA Data Message containing AUTHR to VLR 14 via anOTAServiceProgramming RETURN RESULT message, otaserprog[OTA Data Message]. Steps 6000 and 6100 relay the MSC's message to the AC 22.

At step 6200, the AC 22 determines that the mobile station has been reauthenticated correctly and sends the SMEKEY and VPMASK parameters to the HLR 18 via an AuthenticationCenterDirective RETURN RESULT message, acdir [SMEKEY, VPMASK]. Steps 6300 and 6400 relay these parameters to the MSC 10 in an OTAServiceProgramming INVOKE message. Once provided with the SMEKEY and VPMASK, the MSC 10 is equipped to employ voice privacy and message encryption.

At step 6500, MSC 10 sends an empty OTAServiceProgramming RETURN RESULT message, otaserprog[ ], serving as an acknowledgment that the VPMASK and the SMEKEY were received at the MSC 10, which is relayed in step 6600 to the HLR.

While the VPMASK and SMEKEY parameters may be included in the OTAServiceProgramming INVOKE the first time it is sent to the MSC, carrying the RAND parameter encapsulated in the OTA Data Message, preferably these parameters are sent to the MSC after the AC receives the MS's Re-Authentication Response. This is preferred since the MSC does not have to determine whether the mobile station re-authentication process was successful—with this procedure, the AC knows this information and sends the VPMASK and the SMEKEY to the MSC only if the MS re-authenticated successfully.

Modifications to IS-41 network according to the present invention for implementing Re-authentication for enabling Voice Privacy, Message Encryption or both are to include VPMASK and SMEKEY in the OTAServiceProgramming INVOKE.

Returning to Step S33 of FIG. 4B discussed earlier Registration of the Mobile Station 2 after OTA service programming according to the present invention is accomplished as follows.

If the OTA service programming has been successful and the MSID has changed, the MSC/VLR should delete any database entry for the old MSID. The serving MSC/VLR should send a registration notification to the HLR to register the mobile station 2 and to obtain the user's profile. If the MSID has not changed, then the HLR can update the serving MSC/VLR with the IS41C operations- QualificationDirective and the AuthenticationDirective based on the information held at the HLR.

When the MSID has changed, it is desirable that the MSC/VLR perform normal IS-41 registration operations and obtain the user profile. However, the MSC does not know the new MSID, unless the MSC has parsed the OTA Data Message—which is not desirable.

In IS-683, the CDMA air interface standard for Over-the Air Service Programming, the mobile station's registration parameters are not set to values which cause registration when the mobile station completes OTA service programming and returns to monitoring a control channel. Since the mobile station may have the correct system identification number (SID), Network Identification number (NID), and registration zones, registration may not occur until the mobile station originates a call, the mobile station moves and registration is triggered, or the mobile station's timer expires and performs periodic registration. While operating in the CDMA mode, the mobile station can be forced to register (assuming that the appropriate registration methods are enabled in the IS-95 System Parameters Message) by sending the mobile station the IS-95 Mobile Station Registered Message with the parameters set to values which will trigger registration. For example, setting the SID equal to 0 will trigger registration if parameter registration or zone based registration is enabled. In CDMA mode, the base station can obtain the MIN (IMSI) by an IS-95 Status Message. These methods cannot be used when performing OTA service programming in the analog mode.

Alternatively, registration can be done by transferring the new MSID to the MSC in one of the OTAServiceProgramming messages since the MSC only has the temporary MSID and the MSID previously stored in the MS. This permits the MSC to perform the IS-41 Registration Notification operation. Another alternative is to modify IS-683 and other air interface OTASP standards to have the mobile station clear its registration variables when performing OTA service programming. This will cause the mobile station to register when it returns to the CDMA Paging Channel or analog control channel.

Upon receiving a successful indication of OTA service programming in which the MSID has changed, the serving MSC should also delete the old MSID from its database and perform the existing IS 41-C MSInactive operation with the old MSID (see FIG. 5) to the old HLR. It may be desirable to indicate to the old HLR that the MSID of the mobile station was changed. This could help avoid fraudulent entry into the network.

Releasing a Call according to the present invention is accomplished as follows.

The call can be released by the mobile station when the service programming session is completed. It should also be releasable by the CSC when the service programming session is completed.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for over-the-air (OTA) programming of a mobile station in a visited wireless communication network, comprising:
   generating a transient identifier representative of the mobile station, wherein the transient identifier is generated at a switching center within the visited wireless communication network;
   transmitting the transient identifier from the switching center to a home registry;
   retrieving a mobile station identifier from the switching center by the home registry;
   setting up a data link between the home registry and the mobile station using the mobile station identifier; and
   programming the mobile station from the home registry.

2. The method of claim 1, wherein programming the mobile station comprises changing a service configuration of the mobile station.

3. The method of claim 1, wherein programming the mobile station comprises authenticating the mobile station.

4. The method of claim 1, wherein transmitting the transient identifier from the switching center to the home registry comprises:
   transmitting the transient identifier to an intermediate station;
   forwarding the transient identifier from the intermediate station to a final destination, wherein the home registry is located at the final destination.

5. The method of claim 4, wherein generating the transient identifier at the switching center is initiated by a voice call from the mobile station to the intermediate station, wherein the intermediate station is a service center.

6. The method of claim 5, wherein setting up the data link between the home registry and the mobile station comprises:
   associating the voice call with the data link at the switching center; and
   assigning a register to the mobile station at the home registry.

7. A method for remotely programming a mobile station visiting a serving system, comprising:
   initiating contact with the serving system by the mobile station;
   generating a temporary identification number for the mobile station at the serving system;
   forwarding the temporary identification number from the serving system to a customer service center;
   establishing the identity of the home system at the customer service center;
   establishing a data link between the home system and the mobile station, wherein the serving system acts as a transport medium of the data link;

generating a service programming message at the home system; and forwarding the service programming message over the data link from the home system to the mobile station.

8. The method of claim 7, wherein the serving system comprises a base station and a mobile switching center.

9. The method of claim 7, wherein the home system comprises a home location registry and an authentication center.

10. A system for remotely programming a roaming mobile station, comprising:

a mobile switching center configured to generate a transient identifier for the roaming mobile station, to decide whether to set up a data link between the roaming mobile station and a home system of the roaming mobile station, and to set up the data link between the roaming mobile station and the home system of the roaming mobile station; and a home system configured to store a set of instructions for a processor located at the mobile station, and to set up the data link between the roaming mobile station and the home system if the home system receives the transient identifier for the roaming mobile station.

* * * * *